Oct. 13, 1953  L. ARMBRUSTER  2,654,934
WATCH BRACELET END CONNECTOR
Filed Jan. 27, 1950

INVENTOR.
Ludwig Armbruster
BY Nathaniel Frucht
Attorney

Patented Oct. 13, 1953

2,654,934

UNITED STATES PATENT OFFICE 2,654,934

WATCH BRACELET END CONNECTOR

Ludwig Armbruster, Irvington, N. J., assignor to Forstner Chain Corporation, a corporation of New Jersey Application January 27, 1950, Serial No. 140,843

2 Claims. (Cl. 24—248)

The present invention relates to the manufacture of bracelets, necklaces, and the like, and has particular reference to a novel end connector for a multi-strand construction.

The principal object of the invention is to provide an end connector for a multi-strand bracelet or necklace, which locks the multi-strands in the end connector without the use of solder or the like.

Another object of the invention is to utilize an end connector for a plurality of chain strands, which spreads and distorts the strand ends to lock them in place in the end connector.

With the above and other objects and advantageous features in view, the invention consists of a novel arrangement of parts more fully disclosed in the detailed description following, in conjunction with the accompanying drawings, and more specifically defined in the claims appended thereto.

Figure 1:
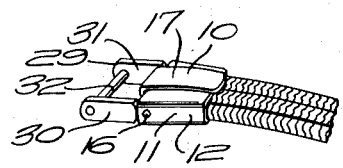
Fig. 1 is a perspective view of an embodiment of the novel end connector, shown with a double snake chain strand secured therein.
Figure 2:
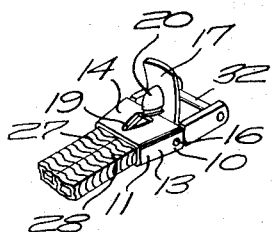
Fig. 2 is a view similar to Fig. 1, the cover lock plate being shown in open position.
Figure 3:
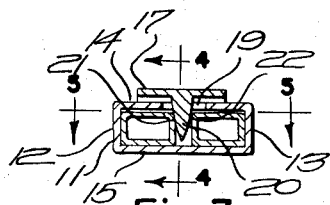
Fig. 3 is a transverse enlarged section, on the line 3—3 of Fig. 4.

It has been found desirable to provide an end connector for a multi-strand bracelet, necklace or the like, in which the ends of the strands may be placed and locked in place mechanically without the use of solder or the like, the mechanical lock permitting quick adjustment for shortening the length of the bracelet or necklace. The preferred mechanical lock is obtained by spreading or distorting the strand ends so that they cannot be pulled out of the end connector.

Referring to the drawings, the end connector 10 illustrated is for a bracelet, and includes a tubular base 11 which has forwardly tapering sides 12, 13, an upper plate 14, and a bottom plate 15. The rear ends of the sides 12, 13 have aligned openings to receive a transverse pivot pin 16, and a cover 17 has a rear portion 18 turned down and its end rolled to swingingly seat on the pivot pin 16.

Figure 4:
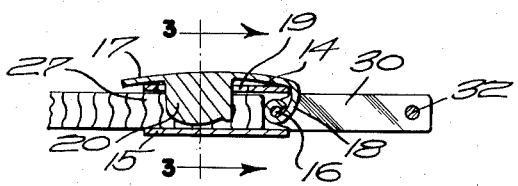
Fig. 4 is a longitudinal enlarged section on the line 4—4 of Fig. 3.

The upper plate 14 has an opening 19, which is generally triangular in shape and centrally disposed, and the cover 17 has a depending projection 20 adapted to seat in the opening 19 when the cover is closed down as shown in Figs. 1 and 4. The projection 20 has tapered sides 21, 22, and vertical side grooves 23, 24 adjacent the forward end of the projection, whereby lateral wedges 25, 26 are provided. When the ends 27, 28 of a double strand bracelet are inserted into the tubular base 11 the opening 19 is positioned over the contiguous sides of the strand ends, and the cover is closed down, the projection 20 spreads the ends 27, 28 apart against the inner walls of the sides 21, 22, and the wedges 25, 26 seat in between adjacent chain links to lock the ends in place.

Figure 5:
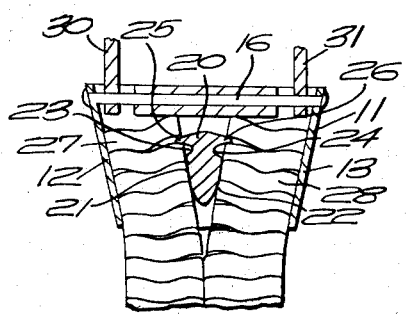
Fig. 5 is a greatly enlarged section on the line 5—5 of Fig. 3.

When the end connector is for a bracelet such as illustrated in Fig. 1, it has an end link 29 with sides 30, 31 hingedly mounted on the pivot pin 16, see Fig. 5, and a transverse connector pin 32. The corresponding other end connector has any suitable standard closure link (not shown) for cooperation with the end link 29. When the end connector is used for connection to a watch bail, any suitable connecting link may be used, or the end link 29 may be modified in known manner to receive a watch bail instead of the connector pin 32.

The above described construction provides a positive lock for strand ends without the use of solder, and three or more strands may be locked in place by suitable modifications thereof.

Figure 6:
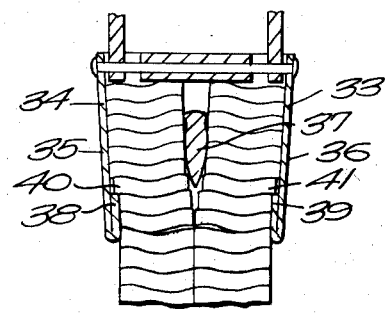
Fig. 6 is a view similar to Fig. 5, showing a modified construction.

If desired, a construction such as shown in Fig. 6 may be used, the end connector 33 having a tubular base 34 with forwardly tapered sides 35, 36, and an upper and lower plate as shown in the modification of Figs. 1 to 5, with a similar top plate opening and a cover with a depending projection 37. In this construction the forward edges of the sides 35, 36 are turned in as indicated at 38, 39, whereby the strand ends 40, 41 are displaced laterally by the projection 37 to wedge behind the turned in forward edges. In this construction, the wedges 25, 26 may be of less width, as the strand lock is against the turned in forward edges of the end connector sides.

Although I have described specific constructional embodiments of the invention, it is obvious that changes in the size, shape, and arrangement of the parts may be made to suit different bracelet and necklace requirements, without departing from the spirit and the scope of the invention as defined in the appended claims.

I claim:

1. In an end connector for a metal bracelet or necklace having at least two strands of links relatively movable with respect to each other, a tubular base having sides tapering forwardly to receive the strand ends therein, an upper plate, and a lower plate, said upper plate having an opening positioned over the contiguous strand sides and a cover hinged to said base and having a depending projection tapering forwardly and adapted to extend through said opening and tapering forwardly for spreading the strand ends laterally apart, said projection having laterally positioned wedges at the rear thereof adapted to lock between adjacent links of the strands.

2. In an end connector for a metal bracelet or necklace having at least two strands of links relatively movable with respect to each other, a tubular base having sides tapering forwardly to receive the strand ends therein, an upper plate, and a lower plate, said upper plate having an opening positioned over the contiguous strand sides and a cover hinged to said base and having a depending projection tapering forwardly and adapted to extend through said opening and tapering forwardly for spreading the strand links within the connector laterally apart, said base sides having inwardly extending abutments at their forward ends, whereby the spread strand links within the connector and behind the abutments are spread laterally by the projection to lock behind the abutments.

LUDWIG ARMBRUSTER.

References Cited in the file of this patent

UNITED STATES PATENTS

| Number | Name | Date |
| --- | --- | --- |
| 230,435 | Pitney | July 27, 1880 |
| 230,436 | Pitney | July 27, 1880 |
| 752,149 | Geer | Feb. 16, 1904 |
| 1,807,293 | Keller | May 26, 1931 |
| 1,819,781 | Kreisler | Aug. 18, 1931 |

FOREIGN PATENTS

| Number | Country | Date |
| --- | --- | --- |
| 630,115 | France | Nov. 23, 1927 |
| 138,669 | Switzerland | Mar. 15, 1930 |
| 152,661 | Switzerland | Feb. 15, 1932 |
| 146,274 | Germany | June 25, 1936 |